(12) United States Patent
Lauritzen et al.

(10) Patent No.: US 9,111,395 B2
(45) Date of Patent: Aug. 18, 2015

(54) AUTOMATIC PLACEMENT OF SHADOW MAP PARTITIONS

(75) Inventors: Andrew T. Lauritzen, Victoria (CA); Aaron Lefohn, Bothell, WA (US); Marco Salvi, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 642 days.

(21) Appl. No.: 12/550,726

(22) Filed: Aug. 31, 2009

(65) Prior Publication Data

US 2011/0050693 A1      Mar. 3, 2011

(51) Int. Cl.
  *G06T 15/60* (2006.01)

(52) U.S. Cl.
  CPC ..................... *G06T 15/60* (2013.01)

(58) Field of Classification Search
  CPC ......... G06T 15/60; G06T 13/80; G06T 15/50; G06T 17/00; G06T 17/05; G06T 19/00; G06T 1/60; G06T 9/00; G06T 2215/12; G06T 2210/12
  USPC ......................................................... 345/426
  See application file for complete search history.

(56) References Cited

U.S. PATENT DOCUMENTS

| | | | | |
|---|---|---|---|---|
| 5,568,595 | A * | 10/1996 | Yosefi et al. | 345/426 |
| 5,870,097 | A * | 2/1999 | Snyder et al. | 345/426 |
| 6,016,150 | A * | 1/2000 | Lengyel et al. | 345/426 |
| 6,525,726 | B1 * | 2/2003 | Xie et al. | 345/421 |
| 2002/0180727 | A1 * | 12/2002 | Guckenberger et al. | 345/418 |
| 2005/0017974 | A1 * | 1/2005 | Hong et al. | 345/426 |
| 2007/0273689 | A1 * | 11/2007 | Tsao | 345/422 |
| 2008/0119280 | A1 * | 5/2008 | Ikeda et al. | 463/42 |
| 2008/0266300 | A1 * | 10/2008 | Deering et al. | 345/502 |
| 2009/0085877 | A1 * | 4/2009 | Chang et al. | 345/173 |
| 2009/0315891 | A1 * | 12/2009 | Lesser et al. | 345/440 |

OTHER PUBLICATIONS

Johnson et al. Soft-Irregular Shadow Mapping:Fast, High-Quality, and Robust Soft Shadows. 2009. I3D '09 Proceedings of the 2009 symposium on Interactive 3D graphics and games, pp. 57-66.*
Lefohn et al., "Resolution-Matched Shadow Maps", ACM Transactions on Graphics, vol. 26, No. 4, Oct. 2007, pp. 1-23.
Dimitrov, "Cascaded Shadow Maps", Nvidia Corporation, Aug. 2007.
Lloyd et al., "Warping and Partitioning for Low Error Shadow Maps", Eurographics Symposium on Rendering, 2006.
Bavoil, "Advanced Soft Shadow Mapping Techniques", Game Developers Conference, San Francisco, Feb. 18-22, 2008.

* cited by examiner

*Primary Examiner* — Maurice L McDowell, Jr.
(74) *Attorney, Agent, or Firm* — Trop, Pruner & Hu, P.C.

(57) ABSTRACT

Shadow map partitions may be automatically placed based on the location or concentration of sample data depth in eye space. An initial positioning for the partitions may be determined based on user specified budgets for number of partitions, computation time, or memory utilization, in some embodiments. The initial positioning may be refined using a clustering algorithm in some cases.

18 Claims, 2 Drawing Sheets

AUTOMATIC PLACEMENT OF SHADOW MAP PARTITIONS

BACKGROUND

This relates generally to graphics processing and, particularly, to the generation of graphical animated images.

Graphics images are generated in a variety of applications, including animated movies and video games. Shadows may play an important role in creating realistic graphic images. A viewer uses shadows to gain an appreciation for the position, size, and geometry of objects in a scene.

In many cases, techniques for forming shadows are subject to aliasing. Aliasing occurs when the local sampling density in the shadow is too low or too high.

Shadow maps are one popular technique for rendering shadows in graphics images. Partitioning algorithms partition a scene and use a separate shadow map for each partition. For example, one shadow map may be used for areas closer to the viewer while another shadow map may be used for areas further from the viewer. However, providing too many partitions may result in rendering too many shadow maps, resulting in a fairly expensive solution.

In some partitioning algorithms, the artist must position the shadow map partition in what the artist believes is the most ideal location. However, this may be time consuming and often the solution is not close to the ideal.

DETAILED DESCRIPTION

In accordance with some embodiments, shadow map partitions may be automatically placed. This automatic placement may be based on the number of samples of pixel data at particular depths in eye space. Eye space is the scene from the point of view of a virtual camera that seems to capture the scene. In contrast, light space is based on the direction from which the scene is lit.

Based on the distribution of pixel depths in eye space, the locations of the shadow map partitions may be determined initially. This initial determination can then be algorithmically improved using clustering techniques in some embodiments.

In some cases, the number of partitions may be set by the user. In addition, the user can control the amount of memory and the time budget to be used for generating the shadows. Then an advantageous placement of shadow map partitions may be achieved given that budget, in some embodiments.

Figure 1:
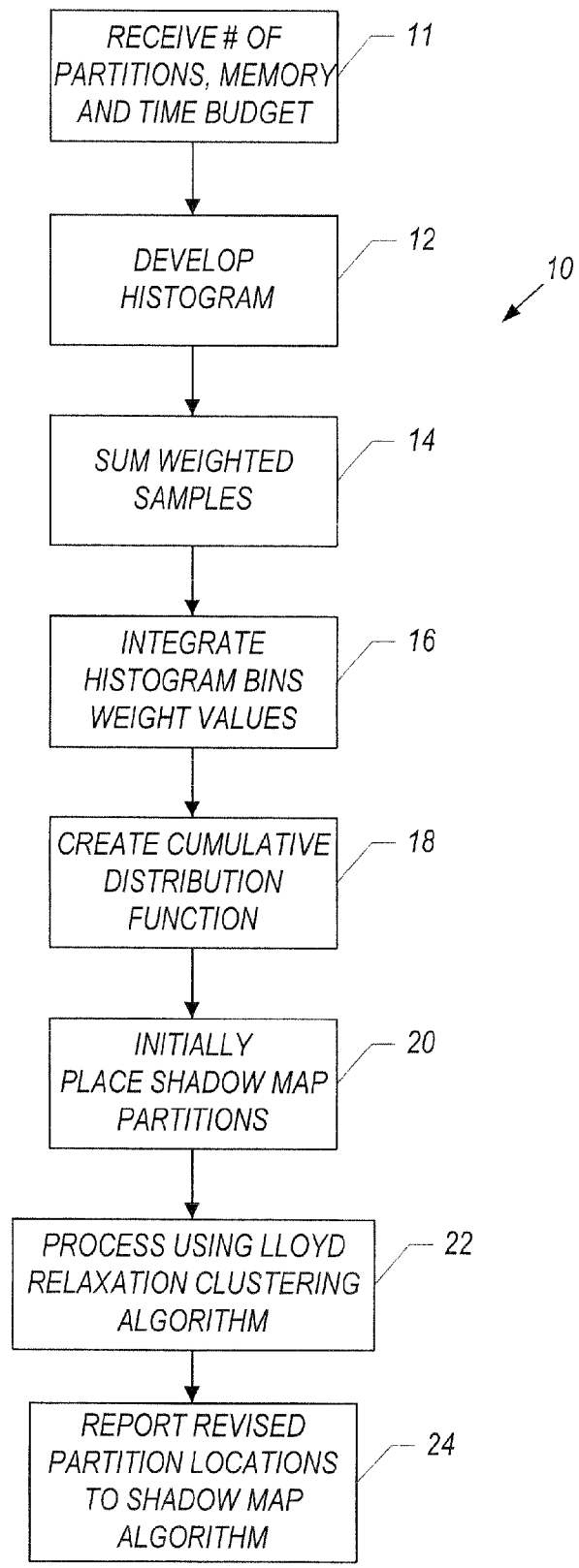
FIG. 1 is a flow chart for one embodiment of the present invention.

Thus, referring to FIG. 1, a sequence, in accordance with one embodiment, may be implemented in hardware, software, or firmware. It may be stored in a computer readable medium, such as an optical disk storage, a semiconductor memory, or a magnetic memory, to mention a few examples. It may be implemented, in software embodiments, by a series of instructions that may be executed by a computer. These instructions may be stored in a tangible computer readable medium, including the types of storage described above. In some embodiments, these instructions may transform data to a human perceptible format suitable for display on a display device.

Initially, the number of shadow map partitions may be received from the user, as indicated in block 11. The user may also provide a memory and time budget, in some embodiments. Then, a histogram is developed for the samples of all the pixels taken in eye or camera space, as indicated in block 12.

In some cases, the histogram may be a weighted histogram such that samples that would not influence or have any affect on the shadows, such as samples that are occluded, may be weighted zero, while other samples may be weighted one. Other weighting algorithms may be used as well.

While an embodiment is described in which a histogram is used, other techniques may be used as well. One value of a histogram is that it can reduce the size of the pixel data set. In some embodiments, the number of histogram bins may be adjusted to adjust the quality of the resulting shadow depictions. Thus, more histogram bins can be provided for higher quality using more computation time or more memory utilization budget and less histogram bins may be used for lower quality to get a faster result or to use less memory. The number of bins may be derived from user specified time and/or memory budgets. In other cases, histograms may not be used at all.

Thus, a histogram may provide a discretized depiction of the depth values from the eye perspective in some embodiments. In some embodiments, this information can be used to place a user specified number of partitions at the most appropriate locations, given the number of samples at particular eye space depths. The number of samples can be analyzed on a bin-by-bin basis.

Figure 2:
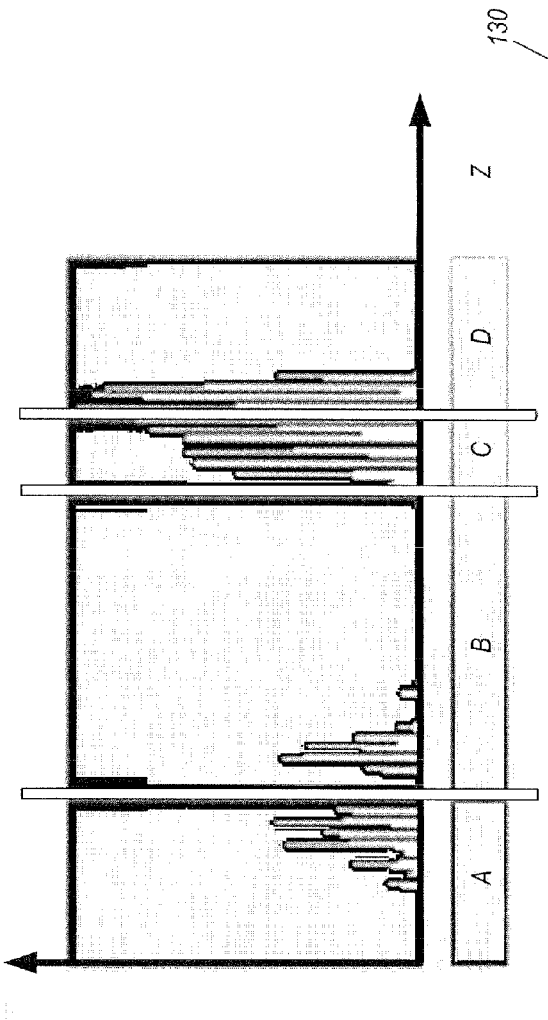
FIG. 2 is a hypothetical histogram in accordance with one embodiment of the present invention.

For example, referring to FIG. 2, a hypothetical histogram is a graph of depths, at regularly spaced intervals, on the horizontal axis versus number of samples on the vertical axis. If the eye is positioned at the zero or leftmost position on the horizontal axis, you can see that a number of samples occur at a given distance from the user. Then there is a reduction in the number of samples, then an increase in the number of samples, and then a period of very few or no samples, and then a high number of samples in this hypothetical example. In one embodiment, the initial partitioning may be done to provide four partitions A, B, C, and D.

In some embodiments, the initial partitioning may attempt to place an equal number of depth samples in each partition. As a result, the partitions may be placed with respect to depth so that each partition is used for the same number of screen pixels.

A two-dimensional bounding box region may be defined in light space where the shadows exist. When a partition is initially identified, the samples in the light space can be examined to create a bounding box around them in light space (also called the light image plane).

The weighted samples may be summed in block 14 (FIG. 1) to produce a total weight for each histogram bin. Referring to block 16, the histogram bin's weight values with respect to depth then may be integrated. The histogram may be considered like a probability distribution function in that it may indicate how many samples fall in each bin, giving a probability that if you choose a random sample, it would fall in that bin. A cumulative distribution function may be derived (block 18) by integrating to get the probability that a sample would fall in a given bin or a bin associated with a depth less than the depth represented by that bin. This integration transforms the data into a format needed for certain clustering algorithms, such as the Lloyd relaxation clustering algorithm. The clustering algorithm may iteratively move the partitions to center them on the depth bin containing the average weight within the partition.

Then, the shadow map partitions are placed relative to the samples, as indicated in block 20. However, this is only initial placement, subject to refinement using clustering algorithm.

A Lloyd relaxation clustering algorithm may be utilized in one embodiment, as indicated in block 22, to more precisely position the partitions. The Lloyd relaxation clustering algorithm is also called the K-means or Voronoi iteration. See J. Sabin and R. Gray, Global Convergence and Empirical Consistency of Generalized Lloyd Algorithm, IEEE Transaction on Information Theory, Vol. 32, No. 2, pages 148-156 (1986). Other clustering algorithms may also be used.

In some embodiments, filtering may also be utilized to create an exponential variance shadow map. See A. Lauritzen, Layered Variance Shadow Map, Vol. 332, Proceedings of Graphics Interface 2008, Windsor, Ontario Canada, pages 139-146 (2008) ISBN-ISSN: 0713-5424, 978-1-56881-423-0.

Finally, the revised partition locations are reported to a shadow map algorithm at block 24. For each partition, the shadow map algorithm renders that region of light space to draw the region into the shadow map. That region is used to apply the shadow test on the scene.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

In some embodiments, less aliasing may be achieved in graphical shadows. In some cases, automatic placement of shadow map partitions may reduce artist time spent in generating depictions. In some embodiments, users may obtain shadow map partitioning within desired time and/or memory utilization budgets.

Figure 3:
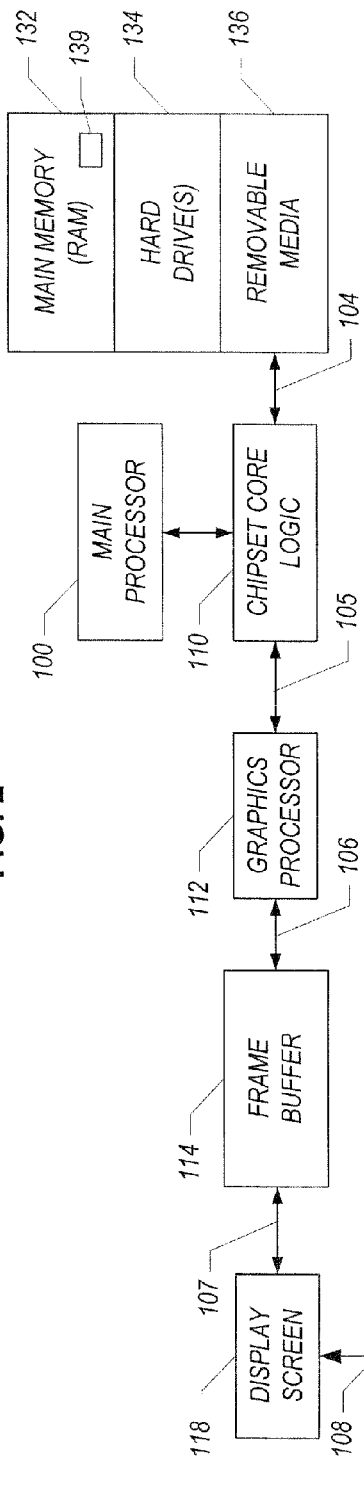
FIG. 3 is a schematic depiction of a computer in accordance with one embodiment of the present invention.

A computer system 130, shown in FIG. 3, may include a hard drive 134 and a removable medium 136, coupled by a bus 104 to a chipset core logic 110. The core logic may couple to the graphics processor 112 (via bus 105) and the main or host processor 100 in one embodiment. The graphics processor 112 may also be coupled by a bus 106 to a frame buffer 114. The frame buffer 114 may be coupled by a bus 107 to a display screen 118, in turn coupled to conventional components by a bus 108, such as a keyboard or mouse 120.

In the case of a software implementation, the pertinent code to implement the sequence of FIG. 1 may be stored in any suitable semiconductor, magnetic or optical memory, including the main memory 132. Thus, in one embodiment, code 139 may be stored in a machine readable medium, such as main memory 132, for execution by a processor, such as the processor 100 or the graphics processor 112.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore; the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer-implemented method comprising:
   binning samples based on occlusion and based on distance from the user;
   defining a two-dimensional bounding box in light space where there is a shadow;
   summing the values of depth samples in each of a plurality of bins;
   calculating an integral of values in each bin with respect to depth to determine a possibility that a given sample falls in a given bin;
   positioning shadow map partitions to center each partition at a depth bin containing an average value within the partition; and
   using a user specified budget for memory utilization or computation time to determine the location of shadow map partitions.

2. The method of claim 1 including using a histogram of the pixel samples at different depth positions to automatically place said shadow map partitions.

3. The method of claim 2 including weighting the pixel samples in said histogram.

4. The method of claim 3 including providing no weight for pixel sample that does not contribute to a shadow.

5. The method of claim 1 including developing a two dimensional bounding box in light space that defines the location of a shadow.

6. The method of claim 1 including integrating the pixel samples.

7. The method of claim 6 including developing a cumulative distribution function.

8. The method of claim 7 including initially placing a shadow map partition by assigning an equal number of pixel samples to each partition.

9. The method of claim 8 including refining the location of each partition using a clustering algorithm.

10. The method of claim 9 including using a Lloyd relaxation clustering algorithm to iteratively move partitions so that they are centered on a depth bin containing an average weight within a partition.

11. The method of claim 1 including applying a user specified budget to determine the location of shadow map partitions.

12. A non-transitory computer readable medium storing instructions for execution by a computer, said instructions to:
   bin samples based on occlusion and based on distance from the user;
   define a two-dimensional bounding box in light space where there is a shadow;
   sum the values of depth samples in each of a plurality of bins;
   calculate an integral of values in each bin with respect to depth to determine a possibility that a given sample falls in a given bin;
   position shadow map partitions to center each partition at a depth bin containing an average value within the partition; and
   use a user specified budget for memory utilization or computation time to determine the location of shadow map partitions.

13. The non-transitory medium of claim 12 further storing instructions to use a user specified budget to determine how to automatically place the shadow map partitions.

14. The non-transitory medium of claim 13 further storing instructions to develop a histogram of the pixel samples at different depths in eye space to automatically place the shadow map partition.

15. An apparatus comprising:
   a graphics processor; and
   a storage coupled to said graphics processor, said graphics processor to:
      bin samples based on occlusion and based on distance from the user;
      define a two-dimensional bounding box in light space where there is a shadow;
      sum the values of depth samples in each of plurality of bins, calculate an integral of values in each bin with respect to depth to determine a possibility that a given sample falls in a given bin; and
      position shadow map partitions to center each partition at a depth bin containing an average value within the partition; and
      use a user specified budget for memory utilization or computation time to determine the location of shadow map partitions.

16. The apparatus of claim 15 including a main processor coupled to said graphics processor.

17. The apparatus of claim 15, said processor to use a histogram of the pixel samples at different depths to automatically place said shadow map partitions.

18. The apparatus of claim 15, said processor to automatically place said partitions based on a budget provided by a user.

* * * * *